G. A. SIMS.
OIL FILTER.
APPLICATION FILED DEC. 24, 1908.
932,063. Patented Aug. 24, 1909.
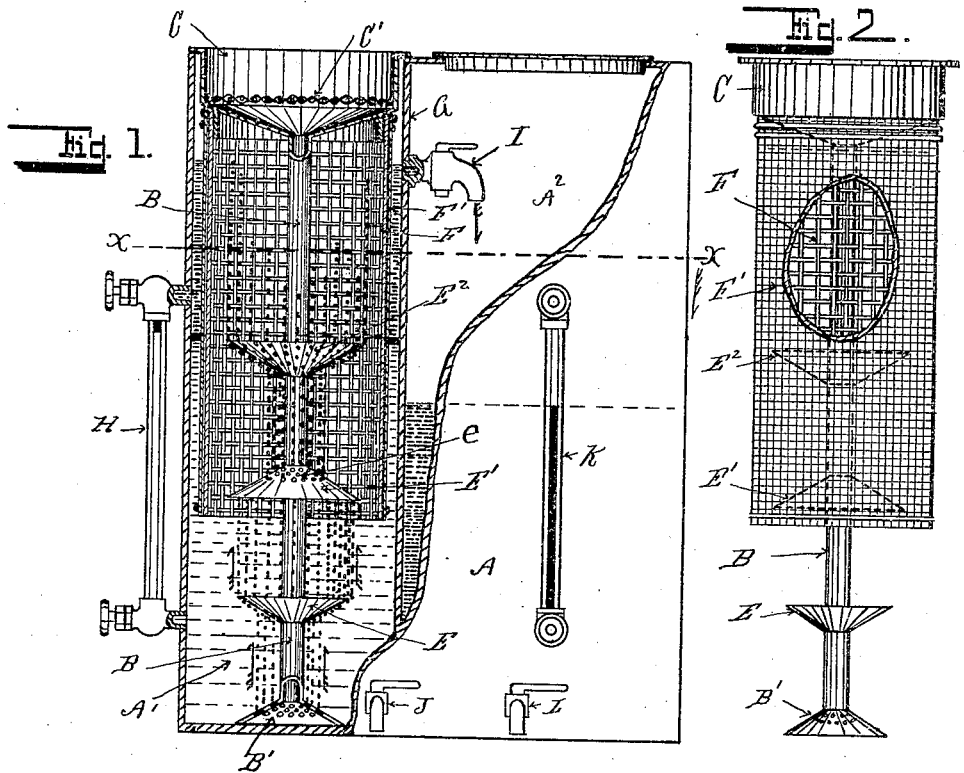
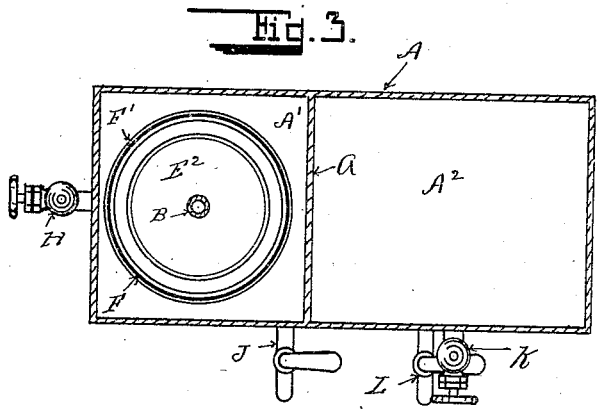
Witnesses.
G. J. Mead
Florence Stockert.
Inventor.
George A. Sims
By J.C. & H.M. Sturgeon
Attys.

UNITED STATES PATENT OFFICE.

GEORGE A. SIMS, OF ERIE, PENNSYLVANIA.

OIL-FILTER.

932,063.  Specification of Letters Patent.  Patented Aug. 24, 1909.

Application filed December 24, 1908. Serial No. 469,093.

*To all whom it may concern:*

Be it known that I, GEORGE A. SIMS, a citizen of the United States, residing at Erie, in the county of Erie and State of Pennsylvania, have invented certain new and useful Improvements in Oil-Filters; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to oil filters, and has for its objects the production of an oil filter in which the oil first passes to the bottom of the filter and thence back up through water, during which upward passage it encounters certain deflectors and finally passes out laterally through a cloth covered screen, from whence it passes to a storage tank.

The features of my invention are hereinafter fully set forth and explained, and illustrated in the accompanying drawing in which:

Figure 1 is a view partially in section and partially in elevation of an oil filter embodying my invention. Fig. 2 is a view in elevation with parts thereof broken away of a portion of my improved oil filter. Fig. 3 is a section of my improved filter on the line $x$—$x$ in Fig. 1, looking in the direction of the arrow.

In these drawings, A is a metal box, preferably rectangular in shape, and divided into compartments A' and A² by means of a partition $a$. In the compartment A' thereof, I place an upright pipe B provided with a perforated conical base B' which rests upon the inside of the bottom of the compartment A'. This pipe B extends upward to near the top of the compartment A' where it is secured in the bottom of an oil receiving pan C, which pan is provided with a screen C' through which the oil passes before passing down through the pipe B. To the pipe B a short distance above the conical perforated base B' I secure a cone-shaped disk E with its apex downward so that oil passing upward through the holes in the base B' impinges against the under side of the conical disk E, and passes from thence upward from the periphery thereof as illustrated by broken lines in Fig. 1. To the pipe B a short distance above the disk E, I secure a second conical disk E' with its apex upward. This disk E' is of greater diameter than the disk E so that it will receive all of the oil passing up from the periphery of the disk E, as is clearly shown by broken lines. Through the disk E', near the pipe B, I make a series of holes $e$ through which the oil passes on upward. To the pipe B above the disk E', I secure a third conical disk E² with its apex downward, it being preferably located on the pipe B so that its outer edge is approximately at the surface of the water with which the lower part of the compartment A' is filled, and the oil in its upward passage from the holes $e$ in the conical disk E impinges against the under face of the disk E² and is thereby spread outward as it passes upward.

Around the pipe B and the disks E' and E², I place a cylindrical wire screen F of comparatively fine mesh, and around this wire screen I secure a cloth screen F', both of which are clearly shown in Fig. 2. This screen F F' extends from the bottom of the pan C downward somewhat below the disk E'. In the side of the compartment A', I place an ordinary sight glass H by means whereof the height of the water in the compartment A' can be observed. In the partition $a$ between the compartments A' and A² near the top thereof I secure an ordinary cock I, through which the oil passes from the compartment A' to the compartment A², and in one of the side walls of the compartment A', I place a cock J through which the contents of the compartment A' can be drawn off. To the compartment A², I secure an ordinary sight glass through which the height of the oil in the compartment A² can be observed, and near the bottom of the compartment A² I place a cock L through which oil can be drawn off therefrom.

In operation the compartment A' is filled with water approximately to or somewhat above the top of the disk E². The oil to be filtered is then fed into the pan C where it passes through the screen C' and down through the pipe B to the inside of the conical base disk B' thereon, thence it passes upward through the holes therein and through the water until it contacts with the under surface of the disk E and it then moves up along the sloping sides thereof and passes upward through the water under the disk E' and up through the holes $e$ therein and through the water until it srtikes the under surface of the disk E and passes off of the periphery thereof upward and through the screens F F′, and then passes through the cock I into the compartment A². In this operation the intervening disks E, E′, E², operate to impede the rapid traverse of the oil through the water and to diffuse it through the water, and thereby greatly facilitate the separation of impurities therefrom.

Having thus described my invention so as to enable others to construct and utilize the same, what I claim as new and desire to secure by Letters-Patent is:

1. The combination in an oil filter, of a receptacle adapted to be partly filled with water, a pipe leading downward to the bottom thereof, a perforated conical disk on the bottom of said pipe, a series of disks secured to said pipe at intervals below the water in said receptacle, a cylindrical screen of wire and cloth around said pipe and disks thereon, and an opening near the top of said receptacle for the exit of oil therefrom, substantially as set forth.

2. The combination in an oil filter, of a receptacle adapted to be partially filled with water, a receiving pan in the top thereof, a screen in said pan, a pipe from the bottom of said pan leading to the bottom of said receptacle, a perforated conical disk on the bottom of said pipe, a conical disk secured to said pipe with its apex downward above the base disk thereon, a second conical disk secured to said pipe, above the base disk, with its apex upward and having perforations through the central part thereof, a third conical disk secured to said pipe with its apex downward above the second disk, a cylindrical wire and cloth screen surrounding the upper part of said pipe and the two upper disks thereon, and means for drawing off oil passing through said cloth and wire screen, substantially as set forth.

3. The combination in an oil filter, of a pipe for the passage of oil downward in the filter, a perforated base on the lower end thereof, a series of conical disks secured to said pipe, the first with its apex downward, the second with its apex upward and having perforations therein, and the third with its apex downward, substantially as set forth.

4. The combination in an oil filter, of a receptacle adapted to be partially filled with water and having an outlet near the top thereof, a pipe extending downward therein for conveying oil to be filtered to the lower part of said receptacle, and a wire and cloth screen in the upper part of said receptacle and extending down below the top of the water in said receptacle adapted to receive the oil as it reaches the top of the water in said receptacle which then passes laterally through an area of said screen equal to the depth of the oil therein, substantially as set forth.

In testimony whereof I affix my signature, in presence of two witnesses.

GEORGE A. SIMS.

Witnesses:
 HENRY SIMS,
 H. M. STURGEON.